Oct. 20, 1942.  E. T. FERNGREN  2,299,084
SEALING AND INSULATING GLASS FURNACE
Filed Nov. 27, 1937
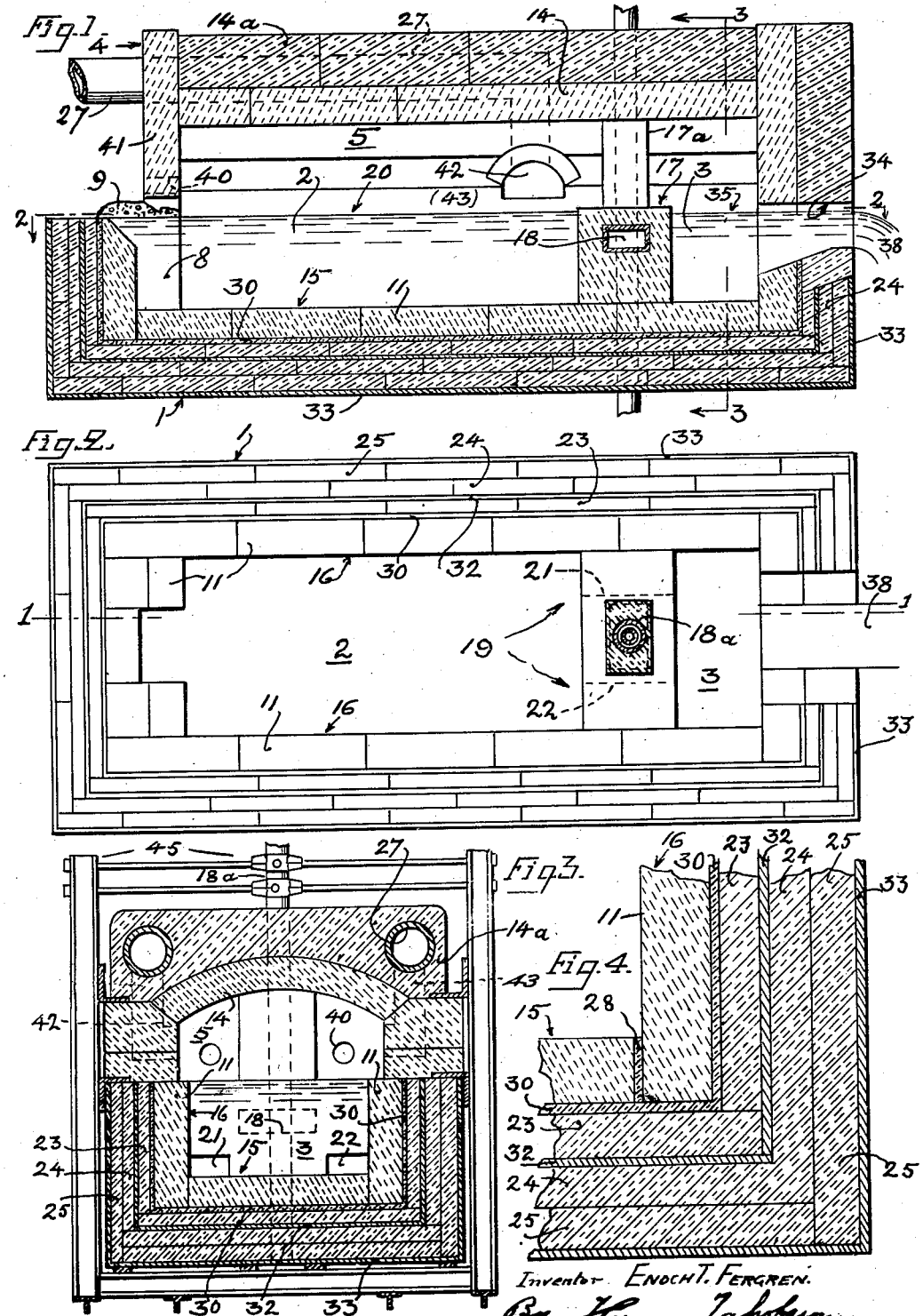
Inventor ENOCH T. FERNGREN.
By Herman Jakobson
Attorney Patented Oct. 20, 1942

2,299,084

UNITED STATES PATENT OFFICE 2,299,084

SEALING AND INSULATING GLASS FURNACES

Enoch T. Ferngren, Little Neck, N. Y.

Application November 27, 1937, Serial No. 176,833

17 Claims. (Cl. 49—54)

This invention relates to improvements in melting-furnaces and is more directly concerned with improvements in glass furnaces, with the object in view of reducing the present day high cost of producing molten glass and also with the object in view of improving the quality of the glass which is produced.

According to this invention, this is accomplished by constructing furnaces which will have longer life and which are so organized as to make possible a reduction in the fuel consumption while simultaneously increasing the glass melting capacity to such an extent that a relatively small melting tank of any type will be able to produce more glass than a much larger tank of any present day design.

To insure these improvements the invention resides, in part, in a method of insulation by which the heat and the heat pressure generated on the inside of a glass melting chamber or space, is caused to be largely retained therein and prevented from being dissipated through the walls of such chamber, or furnace space.

Inherent in the glass factory practices of the present day, is the idea of using up a great quantity of fuel, in fact, from the standpoint of preserving fuel, or heat, the way in which molten glass is produced, is almost as if the glass batch was melted in the open without any heat conserving walls, as the relatively thin shell of a furnace or tank wall now in use, must be continuously cooled off from the outside and caused to give up a great portion of its heat in order to insure that the wall and its individual blocks will be retained in proper shape and position and kept from collapsing.

This continual loss of heat from the walls of a melting tank or furnace, due to its outward heat radiation, is productive of a great loss of heat from the molten glass itself inside of the tank and also sustains an outward flow of heat from the heating space above the glass, thereby constantly tending to reduce the heat pressure and the volume of heat at these points, and making it necessary to use and to consume more fuel to sustain a continuous glass-melting operation and in order to maintain the required pressure of heating atmosphere or combustion, so as to make it capable of releasing enough heat units to replace those which are lost because of the outward radiation alone, or because of the additional exterior cooling of the furnace walls.

Aside from the foregoing uneconomical aspect of present day glass melting practices, there is this to consider, that the outside cooling of the bricks, or blocks, composing the walls of a glass melting-tank, greatly reduces the glass melting capacity and thus reduces the tonnage of the glass produced each working day.

This is due to the fact that the exterior cooling inevitably lowers the temperature and flowability of that portion of the molten glass in a melting tank which is next adjacent to the inner side of the cooled furnace wall. The extent of such cooling will vary, but generally it will be observed that the glass adjacent to the furnace wall will not flow toward the point of delivery from the furnace, but inclines to form a practically stagnant bed, or bank, from 3 to 7 feet wide, having a slow vertical convolution movement downwardly adjacent to the furnace wall, but forming a channel toward the central portion of the furnace, or melting-tank, through which channel the higher temperatured freshly melted glass will flow in a relatively shallow stream from point of introduction of the batch to the point of delivery of the molten glass for use in the forming of mold-charges, or other items of manufacture, or for the drawing of a continuous sheet or glass, but in present day practices this stream is relatively narrow and seldom occupies more space than one-third of the melting space, or distance from wall to wall of a melting-tank or furnace.

To understand how such a condition can exist, it should be observed that even such a small change in temperature as fifteen degrees (15°) will greatly change the fluency, or viscosity of molten glass, hence it can be understood that constant heat loss from the larger portion of the glass in the present day melting-tank tends to lower its fluency and to render it practically stationary while this same glass is constantly being exposed to a high heat condition which, however, is insufficient to offset the heat loss from radiation. As a result, this glass is changed in composition, becoming more sluggish and less fluid as compared to the freshly made portion of the glass in the tank.

Often times this stationary glass becomes so changed in composition that when it is included, even in small portion, into the virgin, freshly made and flowing glass, it becomes a source of contamination of the stream necessitating periodic cessations in glass manufacturing during which the glass in the furnace is boiled up, as the saying is, in the effort to restore a more uniform condition of fluency and composition.

One of the purposes of this invention is to eliminate the causes of glass stagnation, or the forming of a semi-stagnant stream-bed of denatured molten glass, by providing as a normal state, such a highly heated condition in and of the furnace, or tank-wall, that the glass which is next to its inner side will not be cooled or caused to radiate its heat and thus will be maintained in a sufficiently fluent state so it will not cling to the inner side of the tank-wall, but will be in a constant state of direct stream-motion from the melting end of the tank into the refining end and delivery passage therefrom; thereby also insuring a constant renewal of all of the glass body in the melting end of the furnace and insuring a glass of similar consistency and fluency from wall to wall of the melting end, at such points thereof where the batch material has been converted into a molten glass.

Another object of the invention is to prevent loss of heat from the combustion space above the glass in the melting-tank, by providing proper wall construction insulation for the crown portion of the tank to the end that excessive fuel consumption may be eliminated.

Another object of the invention is to aid in equalizing the glass temperature in the vicinity of the delivery end of a continuous melting-tank by abstracting or causing a movement of departure of a suitable amount of heat from the central stream current of the freshly melted glass to thereby reduce its velocity of flow and thus equalize the linear velocity of flow of all of the melted glass towards the delivery end of the tank, so that as a result all of the glass in the refining end of the tank will likewise proceed with a fairly constant and uniform stream-line velocity toward the delivery end and is thus caused to be constantly replaced at the melting end, thereby, in conjunction with a wider or more inclusive melting zone caused by the insulation, features which are to be hereinafter described, insuring a high efficiency in glass melting capacity from a relatively small melting-tank.

The idea of insulating the walls of a glass-melting furnace has been entertained heretofore, but the final solution as to the correct type of construction and material and a general build-up of walls, particularly of the melting-tank, so as to insure a leak-proof construction, is of more recent origin.

In these respects, an important object of the invention is to have a construction not only leak-proof at all portions of its wall but also a construction so arranged that it is entirely fool-proof and incapable of collapsing, or giving way at any point and, to this end, the construction hereinafter illustrated, is of vital importance and, of course, is also an object of invention.

The requirements in the material line for the individual bricks, or blocks, which comprise the upper or crown-portion of the furnace construction, according to this invention would normally be ordinary silica bricks, or sillimanite or any other suitable porous and refractory block or insulation material, such as will withstand the temperatures to which the crown-portion now will be exposed, due to the insulating properties of the material when utilized, as shown in the drawing and according to the intent and purpose of this invention.

The melting-tank, or lower glass melting portion of the furnace should preferably be constructed of a very compacted and entirely vitrified and non-porous refractory material of a relatively high melting point and of high specific gravity. These blocks should preferably be case from an electrically melted alumina-silica material, having a higher specific gravity than the molten glass, so that when these blocks or bricks become highly heated, due to the effect of the outside insulation, they will not tend to float free of the wall of the tank, due to any static pressure of the molten glass.

The floating free of the furnace blocks is further entirely prevented by sealing of all seams between the individual blocks which comprise the glass containing wall portion of the tank or furnace and this, likewise, is an important object of the invention.

By sealing is meant that the wall-blocks in contact with the glass and which blocks become super-heated by reason of their own high heat conductivity and by reason of the outside insulation become cemented together by a refractory glass, or flux, or a molten refractory sealing material having a higher melting point than the glass in the melting-tank, so that none of the glass in the furnace can possibly penetrate any of the seams, or the now closed spaces between the blocks so as to work around and surround any of the said blocks to thereby loosen it from its wall position, or to have corrosive or erosive action on the blocks except only at the inner side, or that face of each block which is constantly exposed to the molten glass.

For closing the seams between the bricks, or blocks, so that none of the molten glass may work its way out, or through any seam or crack, such refractory compositions are preferable which have a higher melting point and which preferably contain less alkali or sodium than any glass composition melted in the tank. The composition of the sealing material should preferably be capable of being partly, or generally, plastically softened at those temperatures at which the glass in the tank is fluently molten, the difference being a matter of degrees in cohesiveness, so that the sealing material, while it may attain some plasticity will be sufficiently solid or non-fluent in the sense of not being dislodgeable or flowable, by its own gravity or by the pressure and the heat of the glass in the melting-tank.

Another way of causing fusion, or a coalescent sealing effect between adjacent faces of tank-blocks to close the seam between them so that no molten glass will penetrate, will consist in applying a coating of a fluxing material to the adjacent faces of the blocks, for instance, a finely ground refractory material, containing a percentage of borax may be sprayed on the side faces of the blocks, then these blocks are dried and when the tank furnace construction is completed the tank furnace is heated by firing, so as to cause a fluxing action between the coated adjacently touching faces of the blocks, after which the glass melting operations may be started, with normal assurance that no leaks will be produced through any of the seams, during the glass melting operations in the tank.

One of the main objects of this invention, as may be apparent, is to provide a new melting-tank construction that will function to melt approximately as much glass, in tons, per day of twenty-four hours, as any glass melting-tank near up to twice its size, while the operative life of the new construction will be greatly prolonged so that in practical fact the original cost of glass making will be reduced in a very satisfactory way.

Other important objects, advantages and new and useful embodiments of this invention will appear as hereinafter described and pointed out, and as indicated in the drawing.

In the drawing:

Figure 1 is a vertical section taken longitudinally at 1—1 Fig. 2 through a small continuous melting-tank structure;

Fig. 2 is the top, or plan view of the lower tank portions of the furnace;

Fig. 3 is a vertical section taken on line 3—3 of Fig. 1;

Fig. 4 is a detail in cross section showing insulational and protective build-up against leaks.

The drawing illustrates only such features as are definitely concerned with a glass melting-tank or furnace construction, and does not show such other exterior means as may be advantageous to employ in the practice of the method of operation hereinafter mentioned.

In order to positively and adequately point out the practical advantages of the invention to those who are skilled in the art of furnace practices, or in matters of furnace construction, there is shown a furnace construction of definite dimension.

The melting tank 1, as illustrated in the several figures, is five feet wide and thirty inches deep, both in the melting end 2 and in the refining end 3.

The upper chamber 5 covered by the crown, or upper-structure 4, is slightly roomier as to its width of space for combustion, as illustrated in Fig. 3, but is otherwise approximately of the same cubic area as the glass containing tank portions 2 and 3.

The tank-wall structure which forms the melting-tank 2 is provided with a batch receiving slightly outwardly projected enclosure, or so-called dog-house 8, for receiving the glass making material 9, which is hereinafter referred to as the batch 9.

In this connection, it is worth while mentioning that it will be advantageous to use a batch material 9 entirely composed of a fritted specially compounded and previously melted glass, forming a granular cullet, so that very little of free alkali, sodium or lime, of any ordinary glass composition, will be available in a free state to attack the inner wall surfaces of the blocks 11, in the tank wall structures 15, 16, nor be free to attack the inner structure of the crown 4 which houses the chamber 5.

When a fritted glass is used as a batch material 9, to produce the molten glass 20, the batch material can be heated to a relatively high temperature before it is introduced into the furnace so that very little extra heat applied thereto will immediately convert the frit, or grit, or granule, into a molten condition and thus a very quick melt is obtained at a much lower cost than otherwise.

In Figs. 1 and 3 of the drawing, is illustrated how the heat of the now mostly wasted furnace gases may be conducted through the conduits or passages 27 in the outer insulating layer 14a, of the crown structure 4, toward the point where the batch material 9 is being introduced, adjacent to which point the heat of the gasses of combustion from conduit 27 may be utilized to pre-heat the batch 9 as said batch is being advanced toward, or approaches the dog-house 8.

The walls of the melting-tank portion 2 and the dog-house 8 are erected of cast refractory blocks 11, formed of a refractory substance having a high percentage, or about 85 percent of alumina. These blocks, when cast, represent the final absolute shrinkage and density in body of a refractory material, which, as stated, is electrically fused and of a highly refractory composition which is melted and cast at a much higher temperature than is necessary for melting the glass in the tank or in a glass-melting furnace.

The blocks 11 are utilized to form the bottom walls 15 and the side walls 16 of the tank structures and the receptacles thereby formed, comprise the melting tank portion 2 and refining end 3. The melting end tank-portion 2 is approximately twelve feet in length and is preferably separated from the so-called refining end 3 by a partition or bridge 17, which also preferably is constructed of electrically fused refractory blocks or bricks of high specific gravity.

The partition 17 has an upward extension 17a and is provided with a central hollow core 18, formed of a metallic or metaloid refractory, through which air is normally circulated by means of vertical conduits 18a in the bridge and its extension for the purpose of absorbing heat from the central portion as at 19 of the glass-body 20 in the furnace.

Heat removing coolers employing water in circulation may also be introduced within the hollow core 18, as an aid in reducing heat condition at the center of the furnace to thereby aid in controlling and equalizing the lineal flow of the glass stream centrally within the melting-tank portion 2 of the furnace, but normally air is sufficient and the air used for this purpose is preferably suitably conducted after it is heated, to be used in connection with the gas or oil burners, or other fuels utilized, thereby restoring a portion of the heat which had been removed from the glass body 20 in the melting portion 2 of the tank.

The partition 17 has two passages 21 and 22, through which the glass is advanced from the melting tank portion 2 into the so-called refining tank portion 3.

The molten glass 20 passing through the passages 21 and 22, will be of a very uniform composition, due to the conditions or establishment of a wider area of melting zone in the tank portion 2, which is induced by the insulation obtained by the refractory layers or slabs 23, 24 and 25, surrounding the bottom wall 15 and side wall 16 of the tank structure and which insulation constantly retains enough heat to promote and make possible an active melting zone clear up to the inner wall face at 16 of the blocks 11 in the melting portion 2 of the tank.

In order to make possible the retention of this melting zone and to thereby have an actual melting of the glass batch 9 in all of the space 2 allotted for the glass melting, it is necessary that all of the blocks, or bricks 11, of the walls 15 and 16, not only be insulated, but also sealed as to all seams or joints between the blocks or bricks 11, so that when said blocks become highly heated, the glass batch 9, or the glass body 20, will be prevented from passing through or working outward from the tank-chambers 2 and 3, through any of the seams 26, between the blocks. In order to insure this condition the seams or joints 26, between the blocks 11 are sealed by a filler 28 of semi-molten refractory substance which acts to cement the blocks 11 so as to form continuous wall slabs 15 or 16, without any seams, which will prevent the molten glass from penetrating said walls.

The joints or seams 26 between the adjacent faces of the blocks or bricks 11, as stated, are sealed preferably by a molten, or semi-molten previously shrunk, fused and inert material 28, having a higher melting point and which is of a composition to be normally resistant to the fluxing action of the molten glass.

In order to bring about this sealing between the blocks and also to effect an exterior seal outside of the blocks, the tanks 2 and 3 and the innermost layers 15 and 16 of the wall structures are highly heated before any glass batch 9 is introduced and any glass melting operation begun, so that the cementation substance 28 will have a chance to melt and to be adhesively joined to, or agglutinated to the faces of the bricks, or may become a fused coating or film portion of the said adjacent faces of the blocks 11, if applied to said faces as a slip or a flux coating, prior to the preparatory firing of the furnace walls, 15 and 16.

The sealing material of the filler 28 may also comprise a thin, more or less glass-like sheet of a fusing substance, which is inserted between the blocks 11 and caused to flux with the side faces thereof, to cause a local joining together of the said faces in a coalescing fashion of the abutting exterior layers of said faces, which are composed of a highly refractory material, and which comprises the adjacent blocks 11.

Very thin sheets or plates of a refractory glass 30, see Fig. 4, may also be used for the filler 28 to close the seams between the blocks 11 for uniting the faces of the blocks.

If the blocks 11 have smoothly ground faces and these faces are held against one another by pressure, so as to have very tight joints 26, something which is possible without great difficulty, in a small melting-tank construction, the seams 26 as between blocks 11, will be leak-free, even when the blocks are highly heated; but such construction involves a more or less resilient tie-rod and exterior bracing arrangement as at 45, Fig. 3, having means for a constant compressive bearing against the slabs or series of blocks 11 comprising the bottom and side walls 15 and 16. However, with the sheets 30 in place, between such walls and the next adjacent outer walls 23 as shown in Fig. 3, or 4, such construction is practical.

Assuming that the blocks 11 are cast to the required shape, of a fused or melted refractory material having an alumina content of about eighty-five percent or more, a suitable bonding and sealing material 28 would be an alumina-silica composition which could be actuated to fuse and flux with the joint-faces at temperatures normally slightly above that of the glass melt.

A refractory glass 30, which will seal without fluxing, but which will adhere to the joint-faces of the blocks 11, at high glass melting temperatures will also be an effective sealing substance of the seams or joints 26.

In any case of sealing it is best that the tank blocks 11 be pre-heated to a high temperature and the sealing or closing of all seams and joints made sure before any glass batch 9 is introduced. During this pre-heating period the tank portions 2 and 3, may be filled with silicon-carbide or other refractory parts having enough of open spaces between them to allow for an effective surface combustion of any gaseous fuel used and during this period external pressure may be applied so as to press the joint-faces of the blocks 11 against one another and against any softer sealing material 28 present in the seams 26 so that external pressure as well as heat may be instrumental in closing the seams 26 between the blocks 11.

As an aid against spalling or cracking of the blocks 11, it is advisable to line the inner faces of the wall portions 15 and 16 with a refractory previously fused material, or even with a glass of high melting point, which will aid in protecting the blocks 11 during the preparatory stages, and when the first glass batch is introduced.

In larger melting-tanks it will be more difficult to exert external pressure in the direction of the tank wall lengthwise thereof, as an aid in sealing or tightening up the seams or joints 26 between the blocks 11, but in such instances, the natural expansion of the blocks 11, when heated, will afford quite a considerable amount of pressure which can be utilized and made effective by adjustment in turn-buckles and other normal outside supporting means.

The construction shown in Figs. 1, 2, 3 and 4, inasfar as sealing is concerned, employs the refractory glass sheets 30 on the outside of the blocks 11 of walls 15 and 16 between said blocks and the adjacent refractory insulation slabs 23. On the outside of the slabs 23 and the wall layer 24 are again inserted the refractory sheets 32, preferably made of a tungsten molybdenum chromium alloy steel although in most instances a chromium nickel iron sheeting can be used.

The glass sheets 30 at the inner surface of the layer 23 will form a tough and slightly softened backing when highly heated for the blocks 11, which will stop all leaks through the spaces or joints 26, or any accidental cracks through the blocks 11. Even if the faces or joints 26 of closely set blocks 11 will be ultimately coated by a glass film from the molten glass in the tanks 2 and 3, such glass film will only have a minimum of action on the material comprising the blocks 11 as if the glass should penetrate the seam or joints 26 a new compound will be formed due to the fact that the glass sheets 30 will stop all actual flow through the spaces or joints 26 and that the glass entering such joints will take on a large percentage of the alumina from the blocks and thus will become practically immovable.

The layers of insulation slabs 23, which normally are made of a more refractory material and of a higher specific gravity than the blocks 11, will likewise aid in sealing under any unusual high temperature condition, and beyond said slabs 23 the metallic sheets 32, which are at the outer margin of the highly heated zone, will prevent any unusual or accidental leakage from the refining tank 3 or the melting end 2, so that at no time will the tank portion construction be in any danger of collapsing.

Beyond the metallic sheets 32 are provided two outer layers or adjacent wall portions 24 and 25 formed of porous refractory insulation bricks, and the whole lower tank construction may be provided with an outside sheeting 33 of steel, and the usual clamping devices as at 43 in Figure 3 for holding the tank walls together.

If a more complete insulation of the tank portions 2 and 3 is desired the bottom blocks 25 may be rested on a twelve inch bed of silica sand and the side wall portions of the blocks 25 may have an extra insulation in the form of a six to twelve inch layer of spun rock or glass wool which will effectively prevent any leakage of heat from the tank construction as such and in such event a metallic sheeting 33 will be advantageous for retaining outside additional insulation in a proper position relative the insulating or refractory brick walls 23, 24 and 25.

From the glass settling tank-end or refining portion 3 is provided an outlet passage 34 which is the final furnace part through which the glass will finally be advanced or caused to flow to the machine elements which will manufacture it into the required articles.

In operation, the batch material 9, which preferably is the previously prepared glass of any suitable well-known formula and which is in a granular or finely divided state, is passed through a conveyor in which it is heated from the exhaust gases from the furnace through the conduits 27 on each side of the insulating layer 14a of the crown 4. This batch is then fed continuously into the dog-house 8 and forms the melting-glass body 20 in the tank portion 2 and the refined body 35 in the tank portion 3, the two bottom streams which are going through the conduit passages 21 and 22 constantly supplying the refined glass body 35 from the melting tank-portion 2 and said glass body then forms the outgoing stream 38 of that molten glass which is in movement through the passage 34.

All of the wall portions of passages 34 surrounding the stream 38 are fully insulated in a manner heretofore described, so that very little heat will be lost from these walls and accordingly the glass will flow in a relatively free stream movement which will include all of the glass body 35 progressively into the stream 38.

As none of the apparatuses for feeding the batch or heating same, or the type of gas or oil burners used has anything to do with the inventions concerned with the tank construction itself, none of these means have been illustrated or shown. However, such innovations which may have inventive merit will be included in other applications for patent, which are to be filed hereafter.

The methods herein described are partly closely related to the apparatus and to the construction herein illustrated and pointed out and inasfar as any means not illustrated in any methods described in the claims herewith, the method is not confined to any particular apparatus, as for instance, the pre-heating of the herein described batch material cullet can be accomplished by very many different apparatuses, while the method of using the heat of the furnaces for such purposes is not depending on any one construction.

There is a measure of economy involved in the use of a pre-melted finely divided glass which resides in this, that in all original glass making the raw material comprising the batch weighs more and is bulkier than the resulting glass made therefrom, hence the freight cost to bring the raw materials to the factory is greater than the same cost for the pre-melted fritted glass batch. Also, it is quite possible to locate large glass melting tanks in localities where all of the glass making ingredients are close at hand, and even where cheap gas, oil and coal and transportation by water are directly at hand, which in conjunction with my sealed furnace construction will reduce the original cost of glass making to a minimum.

The pre-digested glass batch, or fritted glass is produced by pouring a stream of the molten glass into contact with water which breaks up the glass into smaller granular fragments or cullets.

The two greatest economies which are practiceable because of the use of a fritted glass cullet reside in this, that the highly heated and normally mostly wasted gases of combustion can be passed into direct or indirect contact with the glass frit, or granular cullet, which is a good heat conducting material and which is thus quickly heated, so that a relatively soft flame and less intensive generation of heat within the furname will be amply sufficient to melt the preheated glass cullet. The temperature of the waste gases runs from twenty-three hundred degrees F. to eighteen hundred degrees F. when leaving the combustion space of chamber 5 through the conduit 27, so it may be realized that an important economy is effected when this heat is re-captured and transferred to the glass batch.

Other economies reside in a greatly prolonged life in the melting tank, pot, or other forms of glass making receptacle, not to mention a better and more uniform quality of glass ware.

Further, a great savings in cost due to the avoidance of periodic shut-downs of a glass factory for boiling up the melting tank, or other like interferences will now be accomplished and shut-downs will be a thing of the past.

When a stream of glass which has been caused to assume a granular form by quick chilling, is again quickly heated, it not only holds the heat but it tends to break up into smaller granules than the original frit, and which granules are more readily melted when introduced into a melting tank.

Melting and refining of the glass frit into a molten condition free from fine bubbles or other defects will be assisted by the addition of soda, ash and salt cake in smaller amounts, or by adding any other digesting agent, which then may be advantageously mixed with the heated sub-divided cullet at point of introduction into the dog-house 8, or while in process of being introduced, but may also be pre-mixed with the cullet, in which case some of the alkali may assume a molten, or semi-molten condition if the pre-digested cullet is highly heated, however, this offers no impediment to the continuous feeding of the batch into the dog-house. For instance, if a small portion of borax is used, it will act as a lubricant when it becomes molten because of the heat present, or when in contact with any highly heated metallic batch feeding conveyor surfaces, which may be used for introducing the batch 9 into the dog-house 8.

Among such mechanisms for feeding the batch into the dog-house, a positively advancing and batch spreading feeder mechanism would be most advantageous for the type of furnace illustrated.

With regard to the condition of the fritted or granular material, the same may be a completely pre-melted batch in the form of granules or grit, or it may be a partly digested batch still containing free alkalies and lime.

With regard to fuels, gas or oil appear to be most suitable for the majority of localities and for this reason the openings 39 and 40 are provided in the wall 41, so that two burners might be used, which is slightly advantageous over the one burner arrangement, as it enables the establishment of a wider and more completely combusting flame zone. The port openings 42 and 43 being provided, as usual, for the escape of the burnt gases, which are drawn into the passages 27 to be thereafter used in heating the pre-digested batch or the granulated glass material prior to its introduction into the furnace. After serving said purposes the waste gases may be passed to a stack or be otherwise disposed of.

The most important first, single and one thing, which is to be served by the construction, as herein shown, or described, of the walls of the melting-tank proper, is to prevent leaks of the molten glass through the wall bricks 11 of the walls 15 and 16 and if such leaks come about to immediately check the leak by means of the sealing material at 28 or filler 30 and thereafter to retain the greatly softened portion or less rigid sealing material by the more dormant, heat resisting composition of the slabs 23 and if, for any reason, the seams between the adjacent ends of the slabs 23, of which there are but a few, should be inclined to open so as to promote a leak, the use of the metallic shields, or sheets 32, outside thereof will positively prevent even the start of a leak. These metallic sheets 32 are affording a rigid retaining wall outside and will be greatly reinforced by insulation wall portions 24 and 25, while these metallic shields or sheets 32 which may be without any seams or which may be welded together, will positively protect the outside bricks from any contact with the sealing material or with the molten glass of the tank structure. The bottom stratums of the glass in the tank portions 2 and 3 are under considerable of static pressure, which is constantly present and which is sufficient to cause a sustained leak, unless the safeguards herein provided for the wall constructions are employed, however with such modifications as conditions will suggest.

It should be noted that the construction of the furnace wall below the glass level of the furnace is such as to progressively afford, or have fewer seams. The first wall portions 15 and 16 composed of the blocks 11 naturally have the greater number of seams. The next entirely rigid course of refractory blocks are the slabs 23 which can be made large enough to have only a few seams and then outside of these slabs come the metallic sheets or sheet, which can be made without any seams and by the use of which excessive thickness of wall is avoided.

Leaks might be entirely avoided by having several layers of the slabs 23, each exterior layer covering the seams of the preceeding one.

Many kinds of refractory sealing material may be employed and it is advantageous that most of the sealing materials and the slabs 23, as well as the bricks 11, be heavier than the glass of the melting-tank. All of these materials should preferably be slow in fluxing or fusing with the glass and the bricks and slabs in particular should remain rigid while exposed to considerable heat.

The slabs 23, for instance, could advantageously be made of a zirconia-alumina compound or a zirconia-alumina silica compound electrically fused or melted, which of course, may contain small fractions of other oxides or refractory earths.

Even some fusing agent or compounding agent for producing or aiding in the production of slightly porous burnt blocks or slabs 23 may be used with the above refractory material, after the same has been melted and ultimately reduced to a grit or grog, which then is combined with such agent, as a suitable bonding material and pressed, dried and finally burnt to make a refractory slab 23. Such a slab, because of the mechanical structure and chemical components will have a tough and non-cracking body.

There is a decided advantage in using very large slabs 23, so as to avoid secondary leaks and, of course, fewer seams reduce the chances for such leaks, if the slabs 23 have a tough and non-cracking body. The large metallic sheets 32 can be arranged so as to have joints or seams at the lower corner where the bottom and side sheets meet.

It is characteristic of this new construction that a considerable volume of heat will be present in all of the insulated furnace walls and in the various portions thereof, for instance, wall portions, 15, 16, 23, 30 and 32 will contain as much heat in degrees of temperature as the stagnant bed of molten glass which is in evidence in all glass furnaces or tanks where the walls are cooled or permitted to radiate heat. The relatively thick body-wall of the present construction, because of its heat retention, will function practically the same as this stagnant bed of molten glass but, with this difference, that very little if any of walls 15, 16 and cementation substance or any fillers 28 will blend with or contaminate the freshly melted glass which is next adjacent to the inner surface of the side and bottom walls 16, 15, respectively.

The large heat volume sealed up within the wall structures 15 and 16 is the thing which makes possible a body of freshly molten glass which is capable of flowing away from the melting end in a stream formation as wide as the melting tank portion 2.

The lower passages 21 and 22 of the partition 17 will cause an outward deflection of the most fluent central portion 19 of the flowing glass body 20 at this end of the melting tank portion 2 and the greater cooling effect extending from the central portion of the partition or bridge wall 17 will constantly operate to lower the heat pressure of the central portion of the heat volume and of the central portion 19 of the body of glass which will equalize the mobility of the molten glass and thus operate to gradually reduce the velocity of the downwardly and outwardly deflected central portion 19. In consequence the two streams through passages 21 and 22 will be in a uniform molten state and of a like composition, temperature, fluency and cohesive consistency or viscosity, so that the glass body 35 in tank portion 3 will be of like nature and behavior and the outflowing stream 38 therefore will be composed of a glass from which durable and flawless glassware can be made.

Also, the large amount of radiant heat energy which will be retained in the upper or crown structure 4 and flowing through conduits 27 will naturally greatly aid in melting the glass making batch 9.

It can be said that one of the objects of the insulation features in combination with the leak-proofing in its various herein suggested ramifications and with the use of highly resistant high grade refractories, is to broaden the melting zone to such an extent that even the walls of the tank portions will aid in the melting process because of the high heat conserved therein so, that ultimately, the melting glass body 20 will not be retarded by clinging to the inner faces of walls 15 and 16 because the glass body 20 is of a higher fluency, in its marginal portions.

Having thus briefly described my invention, I desire to claim:

1. A melting-tank for glass comprising receptacle melting and refining portions having walls erected of closely set refractory bricks, means comprising refractory sheets of glass-like body and density for cementing together the said bricks and also for joining the bricks to an outside retaining wall of a more highly refractory material, the said material for joining the bricks to the outside retaining wall comprising thin sheets of a refractory non-porous body capable of having a coalescing action with the outer faces of the said bricks which are next adjacent to the said outside wall and also capable of being cemented by heat to the adjacent side of the said retaining wall.

2. A melting tank for glass having inner wall portions formed of previously compacted and fused blocks of entirely non-porous body, means for insulating said blocks comprising refractory substances in the form of slabs, metallic plates and insulation blocks which are placed outside of the said fused blocks for the prevention of leaks of molten glass from said tank and for retention of heat, and means of a different composition and a lower melting point than the fused blocks for uniting the abutting ends of the blocks to form a continuous one piece wall as an inner lining for said melting tank.

3. A melting tank for glass comprising a melting chamber and a chamber for refining the glass, the walls of which are formed of closely set tank-blocks of highly compressed body structure produced from a non-shrinking refractory composition, and means comprising a unitary fused body of lower melting point than the said blocks for causing said blocks to adhere to one another when heated, and metallic sheets of high refractory composition to provide an outside encasement for the said tank-blocks, in combination with plural layers of heat-retaining refractories placed outside of said metallic sheets.

4. A leak-free tank for melting glass and the like, having bottom and side walls, comprising in part a plurality of layers constructed of refractory bricks and slabs, filler sheets interposed and subsequently fused between said bricks and slabs and between the abutting ends of the individual bricks, plates of refractory alloy steel placed outside of the said slabs, insulation bricks in plural layers located next adjacent to said steel plates and a steel sheeting enclosing the outside of said tank construction.

5. A leak-free tank for melting glass and the like, having bottom and side walls, each wall comprising five layers constructed of refractory material, filler sheets interposed between the first and second layer and between the abutting ends of the refractory material bricks which are next to the melting glass and a steel sheeting enclosing the exterior surface of the fifth layer, the third layer comprising plates of refractory alloy metal and the fourth and fifth layer comprising porous heat-retaining bricks.

6. A leak-free tank for melting glass and the like, having bottom and side walls, comprising in part a plurality of layers constructed of refractory bricks and slabs, filler sheets interposed and subsequently fused between said bricks and slabs and between the abutting ends of the individual bricks, plates of refractory alloy steel placed outside of the said slabs, insulation bricks in plural layers located next adjacent to said steel plates and a steel sheeting enclosing the outside of said tank, said refractory bricks consisting of electrically produced, vitrified, non-porous material containing about 85% alumina, heavier than glass, and the filler sheets consisting preferably of a glass-like, alumina-silica composition without voids and able to tightly adher to the brick surface.

7. A tank furnace for melting glass having walls formed adjacent to the glass of closely set heavier than glass tank blocks, a refractory previously fused sealing material in sheet form without any voids therein, said material being of slightly lower melting point than the said blocks but of higher melting point than the glass which is to be melted in said furnace, for uniting the adjacent faces of the said tank-blocks and for sealing over the outer faces of said blocks which are out of contact with said glass, in combination with the refractory heavier than glass material in the form of slabs and forming an outside wall for said tank-blocks and bonded by heat and chemical action to the said previously fused material, said blocks and said slabs being supported and retained by metallic plates formed of a tungsten-molybdenum composition.

8. A leak-free tank for melting glass and the like provided with bottom and side walls, comprising a plurality of courses of refractory bricks of vitrified, non-porous material heavier than the glass which is intended to be molten in the tank, a filler sheet interposed between the inner courses and fused therewith to form a seal, a second filler sheet between the outer courses consisting of a seamless plate of tungsten-molybdenum alloy, and a steel sheeting around the exterior surface of the tank.

9. A leak free tank for melting glass and the like, provided with bottom and side walls, a bridge wall extending across the tank for dividing it into a melting chamber and a refining chamber, said bridge-wall being provided with spaced passages to form communication between said chambers and also provided with a centrally disposed cooling box connecting with a circulating cooling medium in the middle portion of said bridge and bottom walls for causing a greater withdrawal of heat from the central portions of said walls and the central portion of the body of molten glass adjacent thereto, than from the side portions thereof.

10. A tank for melting glass and the like provided with bottom and side walls the inner lining of which is formed of refractory material, a bridge-wall having an upward extension of similar material as said tank walls dividing the tank into forward and rearward chambers, said bridge-wall and its extension being provided with a central cooling chamber having a substantially vertical inlet and outlet conduit through said walls for a circulating cooling medium to produce a heat absorbing condition in said blocks mainly below the surface level of the central portion of the glass body to reduce the temperature of the molten glass and its corrosive action on the bottom wall, said bridge-wall being also provided with a suitable passage forming communication between said chambers.

11. In a heat-insulated glass-melting structure, a tank member, a bridge-wall having an upward extension therein dividing the tank into intercommunicating front and rear chambers, and a superimposed crown member provided with a combustion chamber, the walls of said members comprising a plurality of refractory bricks and porous insulating bricks, respectively, said combustion chamber being in communication with and extending substantially over the entire length of said tank chambers and provided with a fuel-supply means near the forward end of said front chamber, an outlet opening for waste gases from said combustion chamber adjacent said bridge-wall, conduits in the said portion of the insulation course of said crown member running lengthwise therein, between said outlet opening and the forward end of said front chamber, said conduits being adapted to radiate heat back into the combustion chamber and to furnish a portion of the heat for melting the glass batch.

12. In a continuous tank furnace for melting glass, an inner glass-contacting wall course for the tank, formed of vitrified refractory blocks, a re-inforcing wall course adjacent to said blocks comprising slabs made of a compacted semi-fused refractory composition of higher melting point than the said blocks, means for sealing the seams between the blocks and for inter-bonding the slabs to the blocks to form a unitary seam sealed wall structure, said means for inter-bonding comprising a pre-fused refractory material of dense, compacted structure which will form a tough and slightly softened backing for the said blocks when heated to the temperature of the blocks.

13. A melting tank for glass, comprising level bottomed chambers having an inner wall course formed of smooth-faced, closely set tank blocks of high density and gravity, an intermediary refractory wall course and a seamless metallic sheet of refractory composition surrounding said intermediary wall course, and means for establishing a bond between the said blocks and between the said intermediary and inner wall courses.

14. In a melting furnace insulated against the loss of heat, a wall construction which comprises courses of erosion-resisting and corrosion-resisting refractory members providing the inner lining of the furnace, courses of less resisting porous members providing the outer heat insulation portion of the furnace wall, and a leak-arresting, seamless metallic plate interposed between said inner and outer wall-courses.

15. In a melting tank for glass, a wall construction comprising courses of smooth faced closely set, refractory members heavier than glass forming an inner lining in direct contact with the molten glass and outer courses of porous insulation material, in combination with refractory metallic sheets forming a separating layer interposed between said inner and outer courses; said metallic sheets being adapted to positively arrest the seepage of molten glass and prevent the development of a sustained outward leak through said inner lining.

16. In a continuous tank furnace for melting glass, a wall construction comprising, in combination, two adjacent inter-bonded inner wall courses of refractory material and seamless metallic sheets outside of said inner wall courses, and exterior wall courses of porous, heat insulation material outside of said metallic sheets.

17. In a continuous tank furnace for melting glass, an inner wall course in direct contact with the molten glass and consisting of refractory blocks of an integrally vitrified body heavier than glass, a reinforcing wall course adjacent to said blocks comprising slabs made of compacted, semi-fused refractory composition of higher melting point and higher specific gravity than said blocks, and arranged to cover the seams between said blocks, means for sealing the seams between said blocks and for interbonding the slabs to the blocks so as to form a unitary, two-layer seam-sealed wall structure, said means comprising a pre-fused refractory unit-body adapted to form a tough and slightly softened backing for said blocks when at the operating temperature of the furnace.

ENOCH T. FERNGREN.